(12) United States Patent  
Boucher et al.

(10) Patent No.: US 7,739,973 B2  
(45) Date of Patent: Jun. 22, 2010

(54) MASTHEAD CONTROL SYSTEM

(75) Inventors: Stephen G. Boucher, Amherst, NH (US); Robert K. Jeffers, Wilton, NH (US); Roger H. Tancrell, Wilmington, MA (US)

(73) Assignee: Airmar Technology Corporation, Milford, NH (US)

( * ) Notice: Subject to any disclaimer, the term of this patent is extended or adjusted under 35 U.S.C. 154(b) by 437 days.

(21) Appl. No.: 11/110,979

(22) Filed: Apr. 20, 2005

(65) Prior Publication Data

US 2006/0236910 A1 Oct. 26, 2006

(51) Int. Cl.
*B63B 15/00* (2006.01)
(52) U.S. Cl. .................................................. 114/90
(58) Field of Classification Search ............... 73/178 R, 73/181–187; 74/165 B, 115; 114/90, 144 RE; 701/21; 343/709, 710; 340/984
See application file for complete search history.

(56) References Cited

U.S. PATENT DOCUMENTS

| | | | | |
|---|---|---|---|---|
| 3,060,428 A | * | 10/1962 | Dolan | 343/851 |
| 3,374,670 A | * | 3/1968 | Maeder | 73/178 R |
| 3,510,808 A | * | 5/1970 | Baker | 334/49 |
| 3,680,131 A | * | 7/1972 | Hall et al. | 343/710 |
| 4,122,710 A | | 10/1978 | Meller | |
| 4,481,505 A | | 11/1984 | Thompson | |
| 4,522,069 A | | 6/1985 | Birnbaum | |
| 4,823,386 A | | 4/1989 | Dumbauld et al. | |
| 5,390,237 A | * | 2/1995 | Hoffman et al. | 379/88.23 |
| 5,413,061 A | | 5/1995 | Smith | |
| 5,696,861 A | | 12/1997 | Schimmeyer et al. | |
| 5,831,570 A | * | 11/1998 | Ammar et al. | 342/26 B |
| 6,189,471 B1 | | 2/2001 | Mitchell et al. | |
| 6,425,338 B1 | | 7/2002 | Stevenson, IV | |
| 6,798,343 B2 | * | 9/2004 | Carrier et al. | 340/539.13 |

(Continued)

FOREIGN PATENT DOCUMENTS

EP 1134909 A1 9/2001

(Continued)

OTHER PUBLICATIONS

La Crosse WS2305 Professional Weather Station [online] [retrieved on Aug. 23, 2006]. Retrieved from the Internet <URL:http://www.scientificsales.co.nz/catalog/index.php?main_page=product_info&products_i.

(Continued)

*Primary Examiner*—Ed Swinehart
(74) *Attorney, Agent, or Firm*—Hamilton, Brook, Smith & Reynolds, P.C.

(57) ABSTRACT

A masthead control system and method are provided for a sailing vessel to reduce the number of cables running inside the mast to a single coaxial cable carrying power, control and data signals, and VHF radio signals. The coaxial cable connects an antenna directly to a VHF radio communications device such that radio communications are always available in case of emergency. The system comprises an instrumentation center that connects to the masthead; at least one masthead device that connects to the instrumentation center; and a cable, such as a coaxial cable, that connects the instrumentation center to an interface unit located in the hull. The cable carries power, at least one radio frequency signal, and at least one data or control signal between the instrumentation center and the interface unit.

21 Claims, 9 Drawing Sheets

U.S. PATENT DOCUMENTS

2001/0037756 A1 11/2001 Fink
2003/0007614 A1 1/2003 Lamb et al.

FOREIGN PATENT DOCUMENTS

| GB | 1122642 | 7/1966 |
|----|---------|--------|
| GB | 1391162 | 4/1975 |
| WO | WO 03/081905 A1 | 10/2003 |

OTHER PUBLICATIONS

La Crosse WS2300 Professional Weather Station [online] [retrieved on Aug. 23, 2006]. Retrieved from the Internet <URL:http://www.scientificsales.co.nz/catalog/index.php?main_page=product_info&products_i.

La Crosse Weather Station WS2308 [online] [retrieved on Aug. 23, 2006]. Retrieved from the Internet <URL:http://www.sailgb.com/p/la_crosse_weather_station_ws2308/.

Weather Forecaster La Cross WS3600 [online] [retrieved on Aug. 23, 2006]. Retrieved from the Internet <URL:http://www.sailgb.com/p/weather_forecaster_la_crosse_ws3600/.

Oregon Professional Weather Station PC Link Touch Screen Wind Temp Baro Hygro WMR928N [online] [retrieved on Aug. 23, 2006]. Retrieved from the Internet <URL:http://www.sailgb.com/p/oregon_professional_weather_station_pc_link_touch_screen_wi . . . .

Anchor Yacht & Ship Sales [online][retrieved on Aug. 23, 2006]. Retrieved from the Internet <URL:http://www.anchoryachts.com/preview.php?ID=153.

Naviop Integrated Systems Safety and Comfort [online][retrieved on Aug. 23, 2006]. Retrieved from the Internet <URL:http://www.nauticachannel.it/superyacht/505/accessori/naviopeng.htm.

Examination Report under Section 18(3) in GB Application No. GB0607645.9, Mar. 20, 2009.

* cited by examiner

MASTHEAD CONTROL SYSTEM

BACKGROUND OF THE INVENTION

A typical sailing vessel includes a hull and a mast (connected at one end to the hull). A centerboard or keel emanates from the center line of the hull to counter forces exerted through the mast, thereby providing static and dynamic stability to the sailing vessel. On the opposite end of the mast is the masthead. A sailing vessel typically includes multiple masthead devices mounted to the masthead to assist the helmsman in navigating the sailing vessel. One such device is a wind vane. The wind vane is mounted to the masthead where disturbances introduced by the mast and the sail(s) are minimized. Even though electronic wind vanes provide precise measurements, many sailing vessels continue to use mechanical wind vanes in addition to electronic wind vanes because it is convenient for the helmsman to have a view of the mechanical wind vane whenever the helmsman looks up at the sail(s).

Other common masthead devices include lights for various functions. Lights are frequently used to illuminate the mechanical wind vane. Navigational lights, such as bicolor or tricolor lights accompanied by an omni-directional anchor light, may be mounted to the masthead to indicate to other vessels the type and/or size of the vessel and the direction she is moving in relation to the other vessels at night or in other low visibility situations. Placing navigational lights at the highest point of the sailing vessel assures a maximum range of visibility to other vessels.

A critical masthead device is the VHF antenna which is part of the sailing vessel's communication system. The VHF antenna is mounted to the masthead (the highest point on a sailing vessel) to obtain the greatest VHF range because the VHF range is line of sight. The VHF antenna is used for communications especially in times of emergency.

SUMMARY OF THE INVENTION

To operate the masthead devices, a typical sailing vessel includes three cables running within the mast carrying power, control and data signals, and RF signals between the masthead devices and the power supply and other electrical devices located at the hull. The disadvantage of running multiple cables within the mast is that they add significantly to construction costs and to the weight aloft. As the weight aloft increases, the static and dynamic stability of the sailing vessel decreases, thus degrading the overall performance of the sailing vessel and slightly increasing the risk of the sailing vessel capsizing.

In order to reduce the weight aloft, thereby increasing the static and dynamic stability of a sailing vessel, a masthead control system and method are provided reducing the number of cables running inside the mast to a single cable carrying power, control and data signals, and RF signals. Such a system and method also decrease construction costs and provide more space within the mast and on the masthead. The system comprises a mast including a masthead, an instrumentation center that connects to the masthead, at least one masthead device that connects to the instrumentation center and a cable, such as a coaxial cable, that connects the instrumentation center to an interface unit. The cable carries power, at least one radio frequency signal, and at least one data or control signal between the instrumentation center and the interface unit.

Masthead devices include a VHF antenna, an FM radio antenna, a GPS antenna, a cellular antenna, a mechanical wind vane, an electronic wind vane, a temperature sensor, a pressure sensor, an inclinometer, a relative humidity sensor, a heater, a compass, a plurality of illumination lights, and a plurality of vessel running lights. A control center can be connected to or combined with the interface unit to communicate with the at least one masthead device. The control center can include control circuitry for operating the at least one masthead device.

In particular, the interface unit can include a first tuned (or double-tuned) circuit tuned to a first frequency associated with the radio frequency signal and connected to the cable, and a power source, connected to the first tuned circuit to provide power to the at least one masthead device without influencing the radio frequency signal. The first tuned circuit can be responsive to VHF marine band frequencies.

The interface unit can further include a tone generator connected to the first tuned circuit. The tone generator can generate at least one tone signal for controlling the at least one masthead device. The at least one tone signal can be within a frequency band between 5 KHz and 50 KHz.

The interface unit can further include a transceiver circuit tuned to a second frequency associated with the data signals and connected to the first tuned circuit. The transceiver circuit can communicate with the at least one masthead device; for example, the transceiver circuit can send and/or receive data signals to and/or from the at least one masthead device. The interface unit can also include a second tuned circuit tuned to the second frequency associated with the data signals and connected to the transceiver circuit and the first tuned circuit to allow only the data signals to pass through to and/or from the transceiver circuit.

The interface unit can further include a first wireless transceiver circuit in wireless communication with a second wireless transceiver circuit connected to at least one masthead device for sending and/or receiving data and/or control signals to and/or from the at least one masthead device.

The instrumentation center includes a first tuned (or double-tuned) circuit tuned to a first frequency associated with the radio frequency signal and connected between the cable and the at least one masthead device to prevent other instrumentation circuitry from influencing the radio frequency signal. The first tuned circuit can be responsive to VHF marine band frequencies.

The instrumentation center can further include at least one switching circuit connected to the first tuned circuit. The at least one switching circuit is responsive to at least one corresponding tone signal to control at least one corresponding masthead device.

The instrumentation center can further include a transceiver circuit connected between the first tuned circuit and the at least one masthead device. The transceiver circuit can be tuned to a second frequency associated with the data signals for sending and/or receiving data signals to and/or from the interface circuit.

The instrumentation center can include a first wireless transceiver circuit in wireless communication with a second wireless transceiver circuit. The first wireless transceiver circuit can be connected to the at least one masthead device for sending and/or receiving data and/or control signals to and/or from the interface unit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
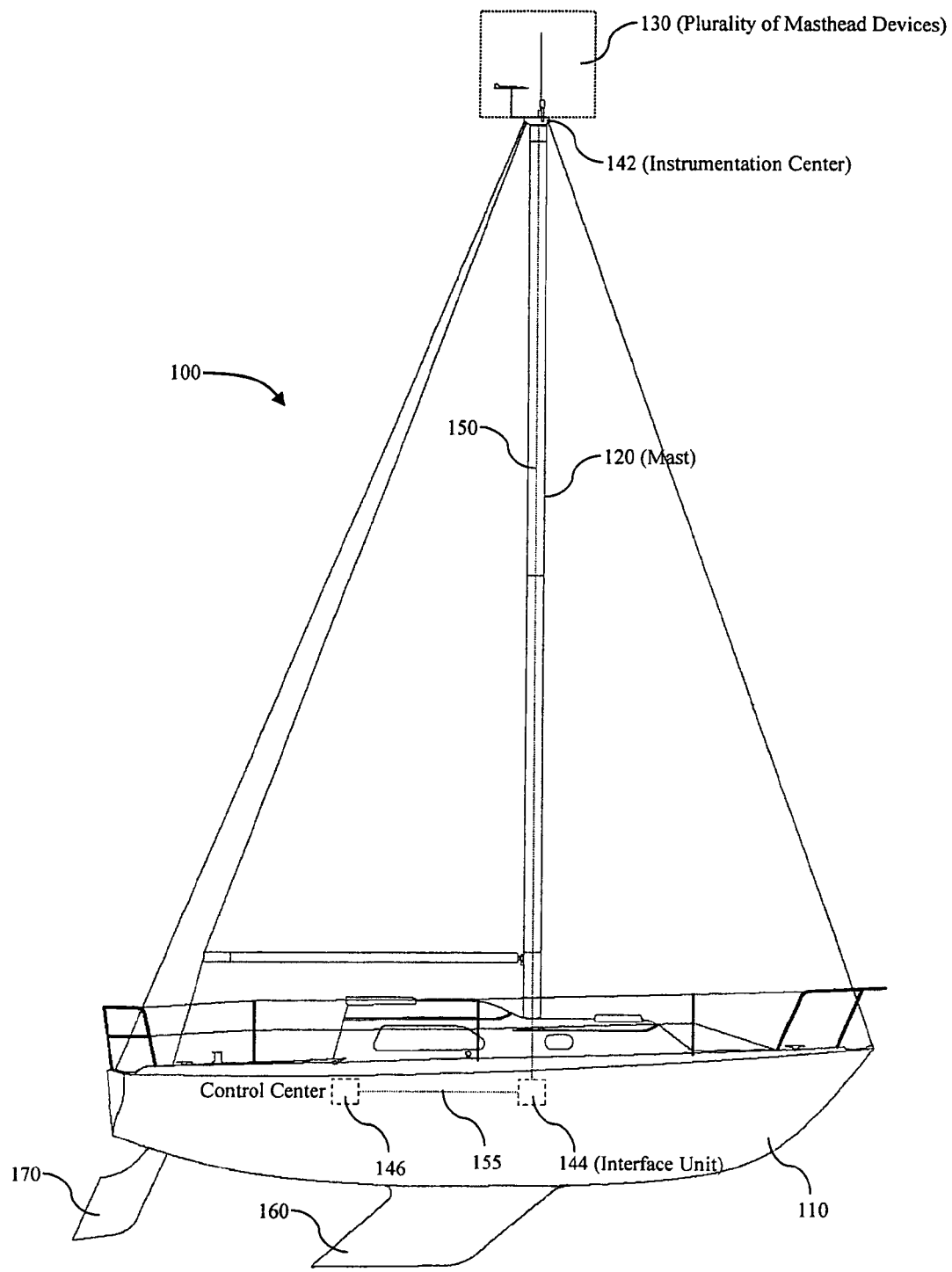
FIG. 1 is a side planar view of a sailboat having a masthead control system.

Referring to FIG. 1, a typical sailing vessel 100 is shown having a masthead control system according to the principles of the present invention. The sailing vessel 100 includes a hull 110, a mast 120, a centerboard or keel 160, and a rudder 170. The designs of the hull 110, the mast 120, and the keel 160 each contribute to the static and dynamic stability of the sailing vessel 100. For example, the hull 110 and keel 160 are designed to counter the destabilizing forces exerted by the mast 120, while the mast 120 is designed not to impose too great of a destabilizing force on the sailing vessel 100. Thus, the mast 120 should be designed to be as light weight as possible. The masthead control system according to the present invention provides a way to reduce weight aloft and reduce the amount of surface area required to mount a plurality of masthead devices 130 atop the mast 120 (masthead).

The masthead control system includes an instrumentation center 142, an interface unit 144, and a control center 146. The instrumentation center 142 is located atop the mast 120 and provides a means for mounting the plurality of masthead devices 130. The use of a single point for mounting the plurality of masthead devices 130, i.e. the instrumentation center 142, reduces the amount of surface area required for individually mounting each masthead device. The interface unit 144 and the control center 146 are located onboard the sailing vessel 100 and provide a means for communicating with the plurality of masthead devices 130 through the instrumentation center 142. Although the interface unit 144 and control center 146 are shown as separate devices they can be combined into a single device.

A single coaxial cable 150 runs within the mast 120 connecting the instrumentation center 142 to the interface unit 144. The use of the single cable 150 reduces the amount of cables needed to power and communicate with the plurality of masthead devices 130, which effectively reduces the weight aloft. Another cable 155 interconnects the interface unit 144 to the control center 146, although, as explained above, the interface unit 144 and control center 146 can be combined into a single device. The cables 150, 155 can be a coaxial-type cable or any other type of cable capable of carrying power and data and control signals between electrical devices without significant losses or attenuation in power or signal strength.

Figure 2A:
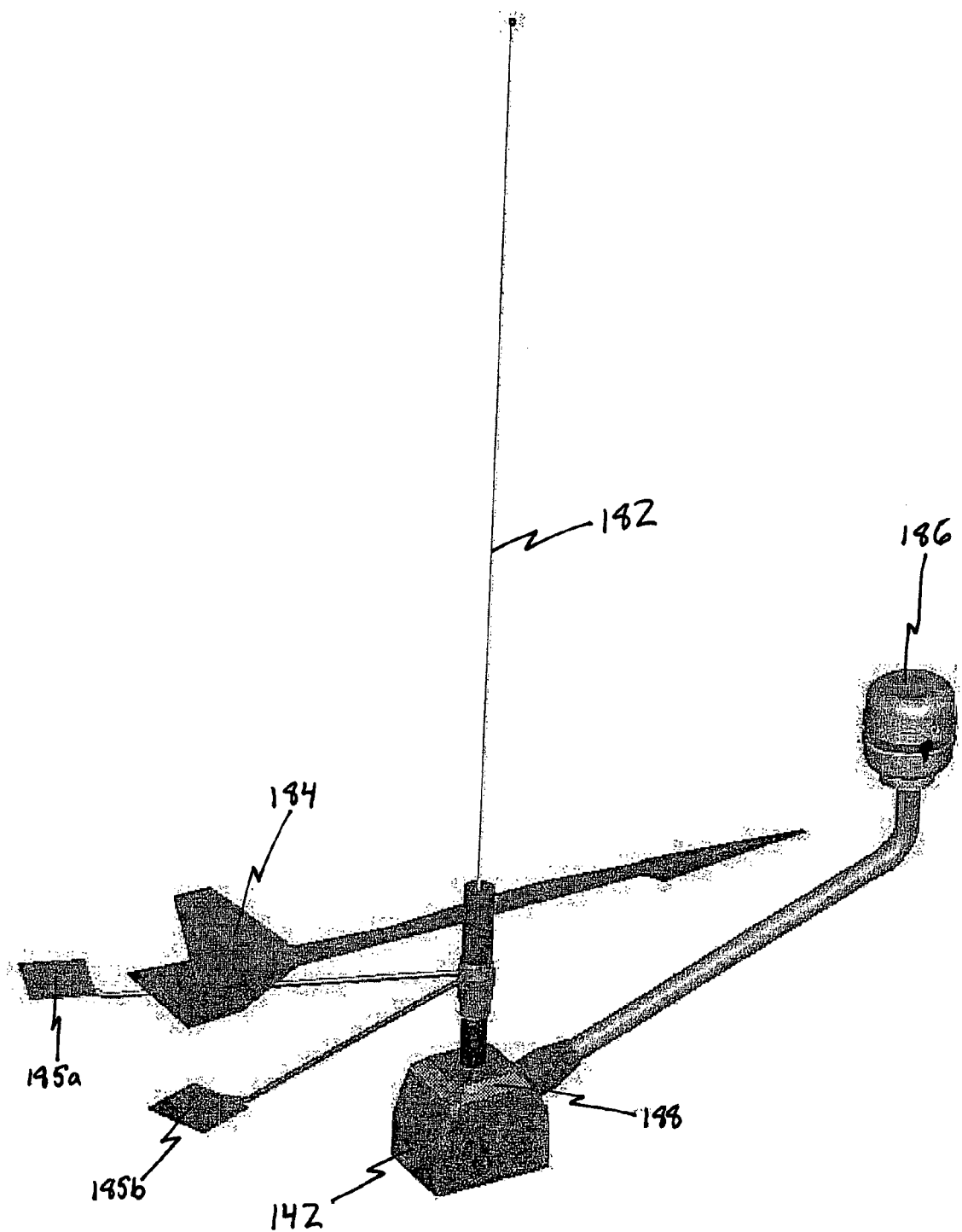
FIG. 2A is a perspective view of an instrumentation center and associated masthead devices.

FIG. 2A shows a perspective view of one embodiment of the instrumentation center 142 including a plurality of mastheads devices 130 (FIG. 1). Each of the masthead devices is mounted to the instrumentation center 142 containing circuitry coupling some of the masthead devices to the single cable 150 carrying power, data and control signals, and VHF radio signals between the instrumentation center 142 and the interface unit 144 (FIG. 1).

The masthead devices 130 can include an antenna 182 in any combination with, a mechanical wind vane 184 with tacking tabs 185a and 185b, an electronic wind vane (weather station) 186, and illumination lights 188. The antenna 182 is a typical VHF antenna which allows the sailing vessel 100 (FIG. 1) through an onboard (marine band) radio to communicate with other (marine band) radios, such as a coastguard vessel, a coastguard station, or other nearby vessels or stations, especially in times of emergency. The mechanical wind vane 186 with tacking tabs 185a and 185b provides a visual indicator to the helmsman steering the vessel of the direction of the wind. The electronic wind vane 186 provides digital information related to wind speed, direction, and temperature and is further described in French Letters Patent No. 2,800,876 issued on Jan. 18, 2002, the entirety of which is herein incorporated by references. The lights 188 illuminate reflective material disposed on a downwardly facing surface of the mechanical wind vane 184 and the tacking tabs 185. This setup gives the helmsman the ability to navigate the sailing vessel at night or when visibility is limited. Other masthead devices can also be mounted to the instrumentation center 142, such as running lights, anchor lights, and a cellular antenna to name a few. It should be understood by one skilled in the art that any device typically mounted on the masthead can be mounted on the instrumentation center 142.

Figure 2B:
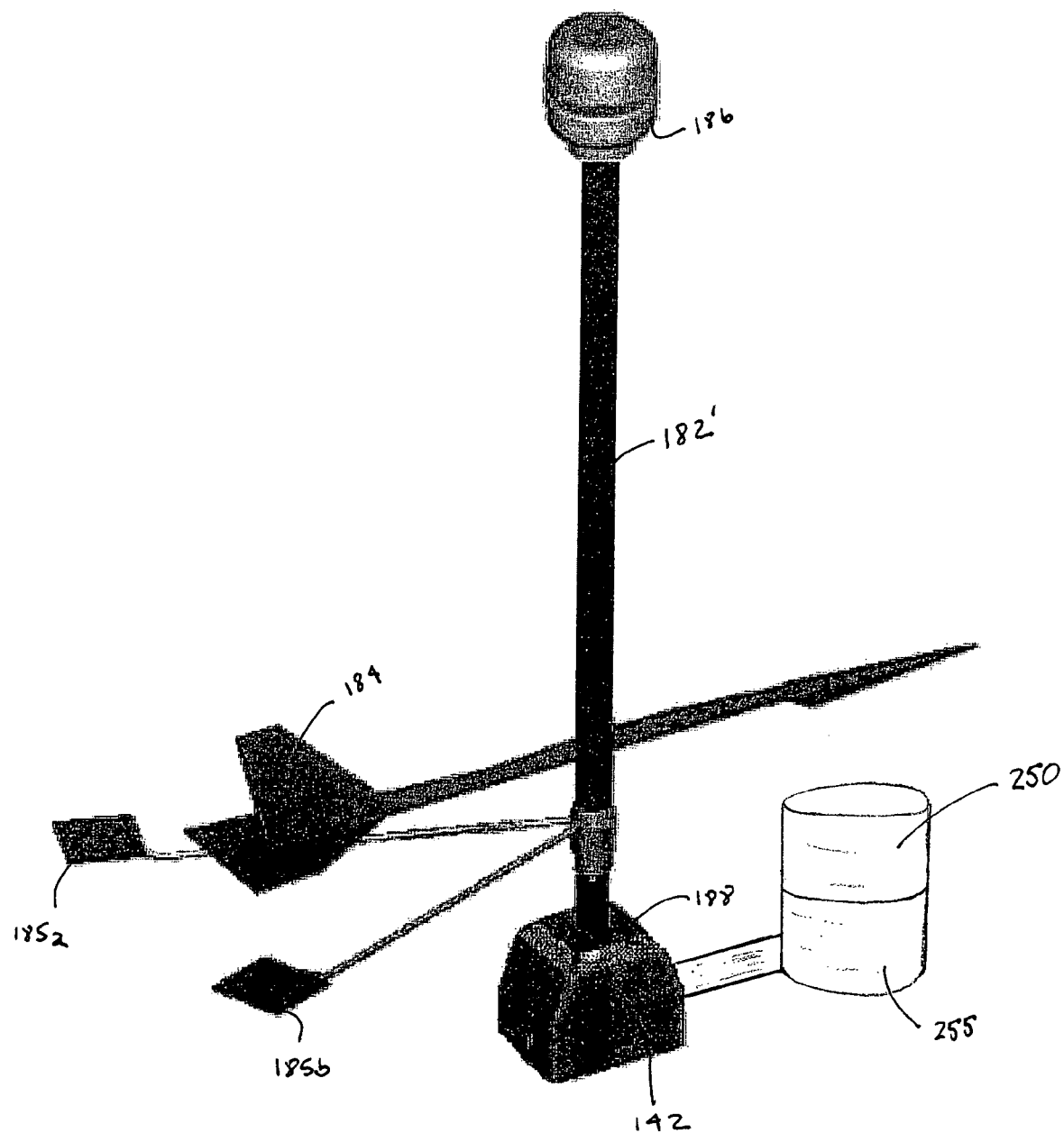
FIG. 2B is a perspective view of an instrumentation center and associated masthead devices.

FIG. 2B shows a perspective view of another embodiment of the instrumentation center 142 of FIG. 2A. The antenna 182' has been constructed to be a hollow rigid antenna. In this configuration, the electronic wind vane 186 can be mounted to the top of antenna 182' such that the electronic wind vane sensors are in clear communication with the prevailing wind. Bicolor navigational lights 250 and anchor lights 255 may mount to the instrumentation center 142.

Figure 2C:
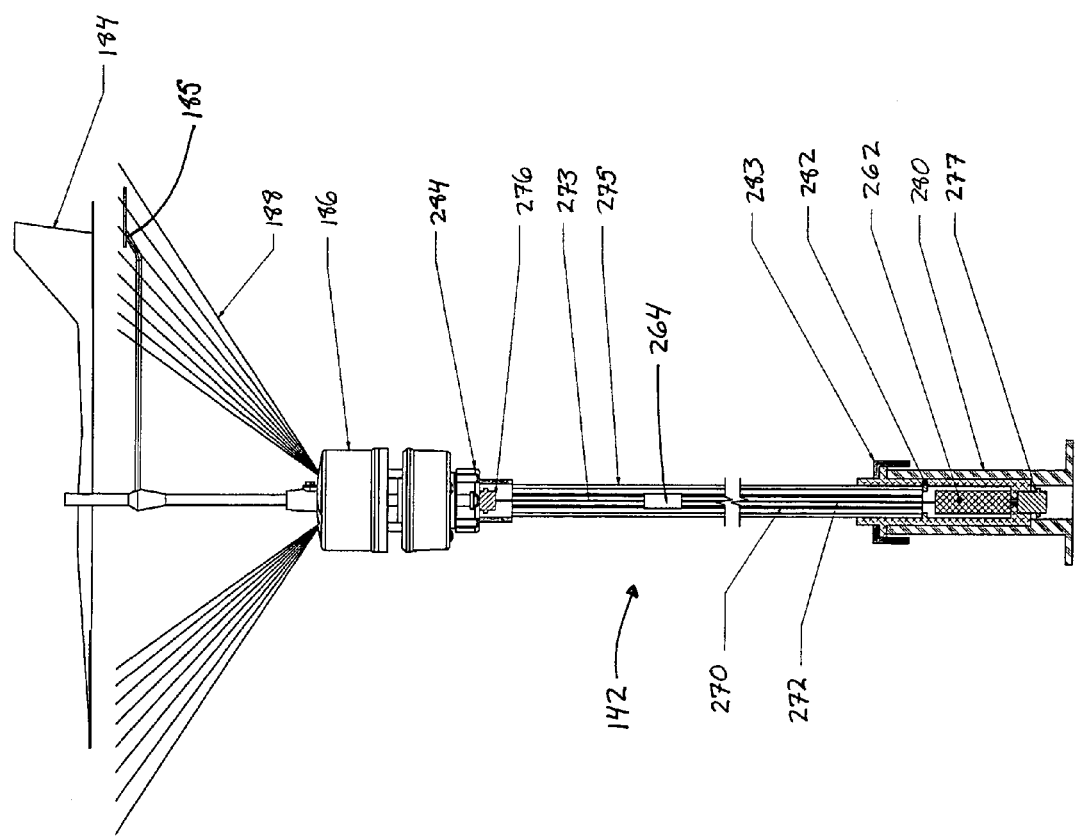
FIG. 2C is a sectional view of an instrumentation center and a side view of a weather station coupled to the instrumentation center.

FIG. 2C shows a sectional view of an instrumentation center 142 including a dipole antenna 270 and a side view of a weather station 186 coupled to the instrumentation center 142 according to another embodiment. The coaxial cable 150 running up the mast 120 from the interface unit 144 connects to the instrumentation center 142 at the connector 277. The instrumentation center 142 includes a printed circuit board 262 enclosed within an aluminum ferrule 282. The printed circuit board 262 may include a modem and a diplexer. The printed circuit board 262 connects through a coaxial cable 272 and three twisted pairs 273 to a diplexer 264 and a weather station 186, respectively. The diplexer 264 connects to a copper tube dipole antenna 270, which may be adapted to receive either or both VHF and FM radio signals (the conventional FM radio band ranges between 88-108 MHz). The copper tube dipole antenna 270 may be fitted within a tube 275 transparent to electromagnetic energy at least at the VHF marine band and/or FM radio band frequencies, such as an E-glass tube. The tube 275 connects at one end to the aluminum ferrule 282 which is fastened to the aluminum bracket 280 by a first nut 283. The aluminum bracket 280 in turn mounts to the masthead.

The weather station 186 is fastened to the tube 275 by a second nut 284. The electronics of the weather station 186 connects at connector 276 to the three twisted pairs 273 carrying power and data signals between the weather station 186 and the printed circuit board 262. The weather station 186 may include an electronic wind vane, a temperature sensor, a pressure sensor, an inclinometer, a relative humidity sensor, a GPS receiver, a compass, and a surface heater. The surface heater minimizes the effects of adverse conditions (e.g., wet or freezing conditions) on the weather station 186 sensors. The mechanical wind vane 184 (e.g., a Windex®) with tacking tabs 185a and 185b and the illumination lights 188 described above may also attach to the weather station 186 as further shown in FIG. 2C.

Figure 3:
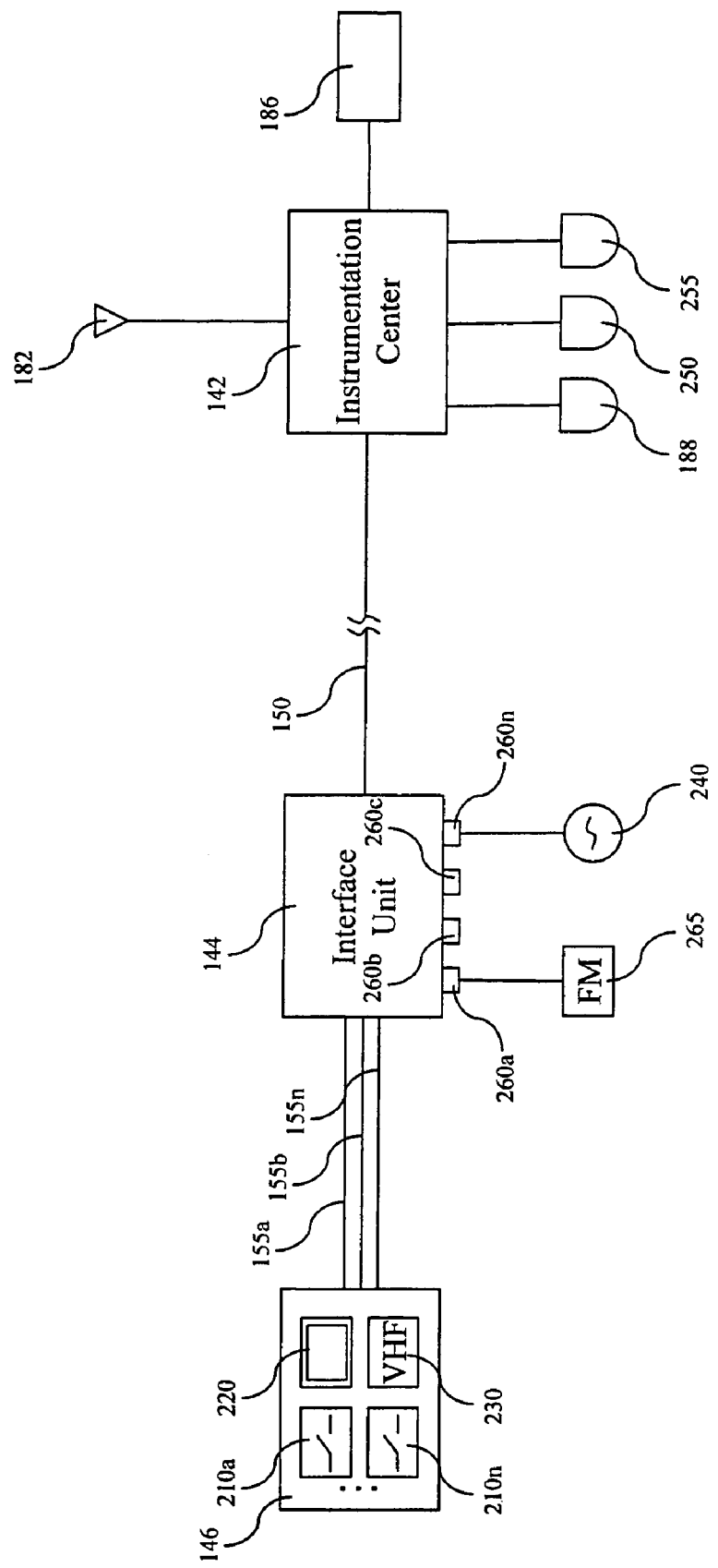
FIG. 3 is a block diagram of the masthead control system.

FIG. 3 shows a block diagram of the masthead control system. The control center 146 can be located at the helm or driving station of the sailing vessel 100 (FIG. 1) and can include various components, such as a VHF radio 230, digital display 220, and control electronics 210a ... 210n. The control center 146 may be coupled to the interface unit 144 through cables 155a, 155b, ... 155n. The VHF radio 230 is directly connected to the antenna 182 through the interface unit 144. Accordingly, a malfunction or failure of the masthead control system would not interfere with radio communications. The digital display 220 can be coupled to a processor (not shown) for displaying information received from the masthead devices 130 (FIGS. 1-2C, e.g., the electronic wind vane 186). The control electronics 210a ... 210n can be a series of switches for operating the navigational lights 250 (i.e., running lights), the anchor lights 255 and/or the illumination lights 188.

Any number of electronic devices can connect to the interface unit 144 through connectors 260a, 260b, 260c ... 260n. For example, an FM radio device 265 may access FM radio signals from the copper tube dipole antenna 270 (FIG. 2C) by connecting through connector 260a to the interface unit 144. A power source 240 can be coupled to the interface unit 144 through connector 260n and/or the control center 146 for providing power to the masthead devices 130 (FIGS. 1-2C) and/or the various components located in the control center 146. The power source is typically 12 VDC, however the power source can be any type of power source known.

Figure 4A:
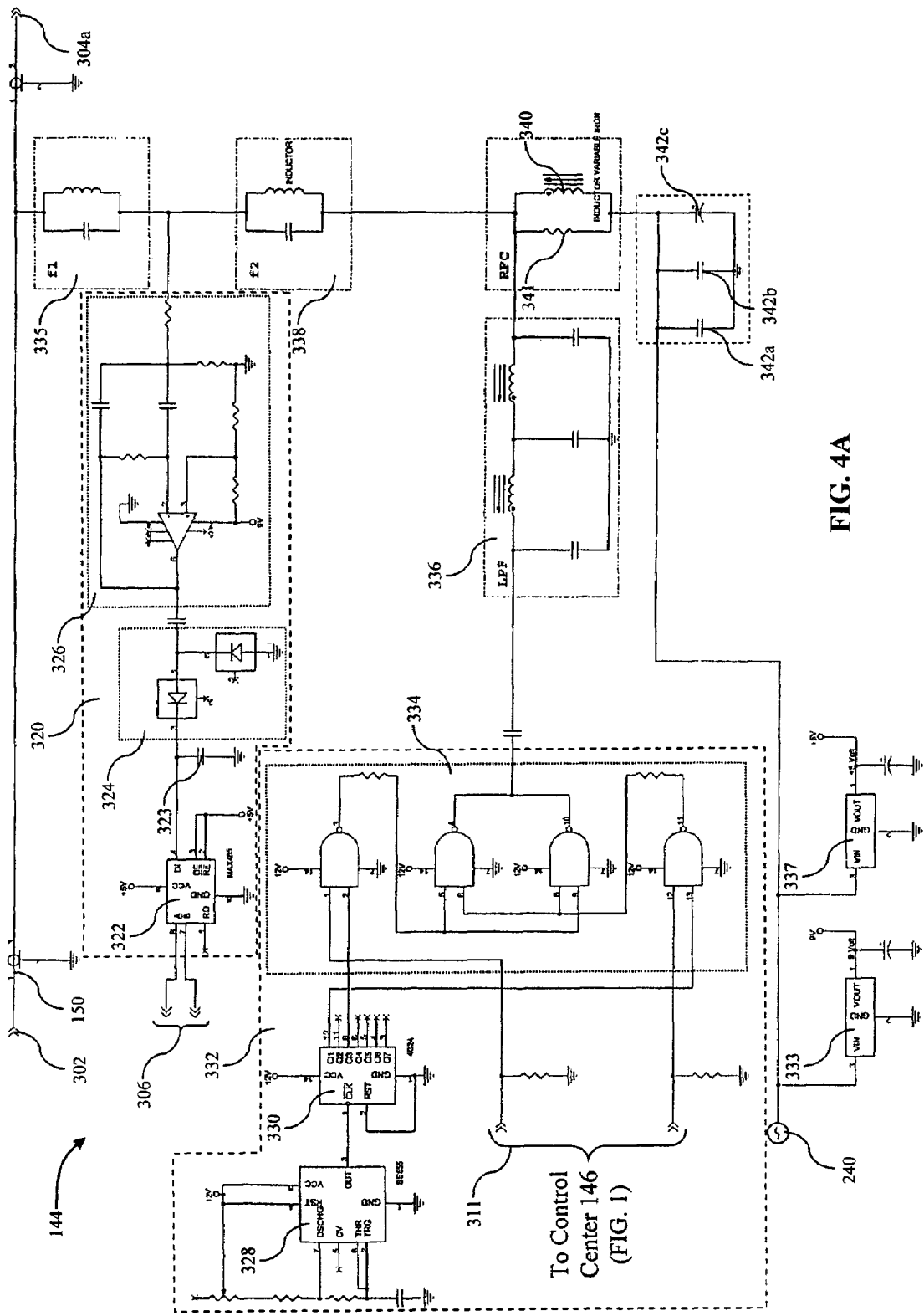
FIG. 4A is a circuit block diagram of an interface unit.

Referring now to FIG. 4A, a circuit block diagram of the interface unit 144 of FIGS. 1-3 is shown. In one embodiment, a VHF radio (not shown) connects at 302 to a center conductor of a coaxial cable 150 passing through the interface unit 144. In this way, the VHF radio 230 connects directly to the antenna 182 (FIG. 2A-3) without any intervening electronics. Thus, radio communications are always available even if the masthead control system malfunctions or fails. The center conductor of the coaxial cable 150 connects at 304a to the cable 150 running up the mast 120 to the instrumentation center 142.

The interface unit 144 includes tuned circuits 335, 338, a data transceiver circuit 320 (to transmit and receive data to and from the masthead devices), a tone generator 332, and circuitry for conditioning the output from the power source 240. The tuned circuit 335 is resonant in the VHF marine band to allow a VHF radio 230 (FIG. 3) connected at 302 to communicate on the VHF marine band. The tuned circuit 335 can have low DC resistance to permit DC current to pass through without undue loss. In one embodiment, the tuned circuit 335 can be a double-tuned circuit to achieve wider bandwidths.

The power source 240, such as a battery, provides power to the masthead control system. The power source 240 can provide 12 volts of direct current and the circuitry of the interface unit 144 can receive other voltages from regulators 333 and 337. The power source 240 connects to a bank of capacitors 342a, 342b and 342c connected in parallel bypassing the power source 240 to ground for all frequencies ranging from the audio frequencies to the VHF marine band. The bank of capacitors 342 filters out stray radiation introduced by the power source 240 and the inductors of the interface unit's circuitry. Capacitor 342a can have a large value (e.g., 47 µF) associated with audio frequencies and can be an electrolytic capacitor. Capacitor 342b can have a smaller value (e.g., 0.1° F.) associated with higher frequencies (e.g., 240 kHz) and can be a ceramic capacitor. The third capacitor 342c can have an even smaller value (e.g., 0.001 µF) associated with even higher frequencies such as VHF marine band frequencies (i.e., 156-162 MHz in the United States). Capacitor 342c can be a ceramic or mica capacitor. Thus, by using several capacitors, a low impedance to ground can be maintained over the wide range of frequencies required for the masthead control system. It should be understood that the bank of capacitors 342 can be arranged in any order.

The bank of capacitors 342 connects to the first tuned circuit 335 through a radio frequency choke (RFC) 340. The RFC 340 prevents interference from being introduced by the power source 240.

The tone generator 332 provides signals to control power to the masthead devices 130. In one embodiment, the tone generator 332 can include an oscillator 328, a circuit having a series of flip-flops 330, and a series of logic gates 334. The oscillator 328 can be an integrated circuit configured as an oscillator producing a pulse train such as 80 kHz. The circuit having a series of flip flops 330 divides the output of the oscillator 328 into 40 kHz and 10 kHz square waves. These square wave signals are fed to the series of logic gates 334 interconnected to form two on/off switches with a common output. Additional logic gates 334 can be added to form more than two on/off switches. The tone generator 332 receives power from the power source 240 and is controlled by inputs 311 from the boat's masthead control center (e.g., a circuit breaker box or other control panel). When a voltage is applied to any or all inputs 311, (corresponding to such masthead devices as anchor lights and running lights) tone signals are generated by the tone generator 332. The output to the tone generator 332 is fed to a low pass filter 336 to eliminate the harmonics of the square waves generated by the tone generator 332. These tone signals are detected by the instrumentation center 142 which responds to the detected tone signals by disabling the masthead device or devices assigned to a predetermined frequency.

The RFC 340 is an inductor that has a high reactance at the frequencies of the tone generator 332, thus providing a high impedance to the tone frequencies and a low impedance to the power source 240. The RFC 340 may have low DC resistance such that a significant voltage drop is not created, resulting in a loss of voltage at the masthead. A resistor 341 connects across the inductor to terminate the low pass filter 336.

A transceiver circuit 320 can be connected between the first tuned circuit 335 and the RFC 340. The transceiver circuit 320 in this embodiment is configured to receive digital data signals sent from masthead devices, but can also be configured to send and/or receive digital data to and/or from the masthead devices. The transceiver circuit 320 includes a data converter 322, a rectifier 324, a bandpass filter 326, and a second tuned circuit 338. The second tuned circuit 338 is connected between the first tuned circuit 326 and the RFC 340 and is tuned to the operating frequency of the data converter 322. The second tuned circuit 338 in one embodiment can be tuned to 240 kHz. The bandpass filter 326 connects to a line between the first tuned circuit 335 and the second tuned circuit 338. The bandpass filter 326 has a center frequency equal to the operating frequency of the data converter 322 which, in one embodiment, can equal 240 kHz. The output from the bandpass filter 326 is fed to the rectifier 324, the output of which is smoothed by a capacitor 323. The rectified and smoothed signal is then input to the data converter 322. The data converter outputs 306 can be connected to a device (not shown) to process and display the data from the masthead devices. In one embodiment, the data converter 322 receives NMEA 0183 code from a masthead device, e.g., the electronic wind vane 186.

In another embodiment, the transceiver circuit 320 can be replaced by a wireless transceiver coupled by a wireless communications link to a wireless transceiver in the instrumentation center 142.

Figure 4B:
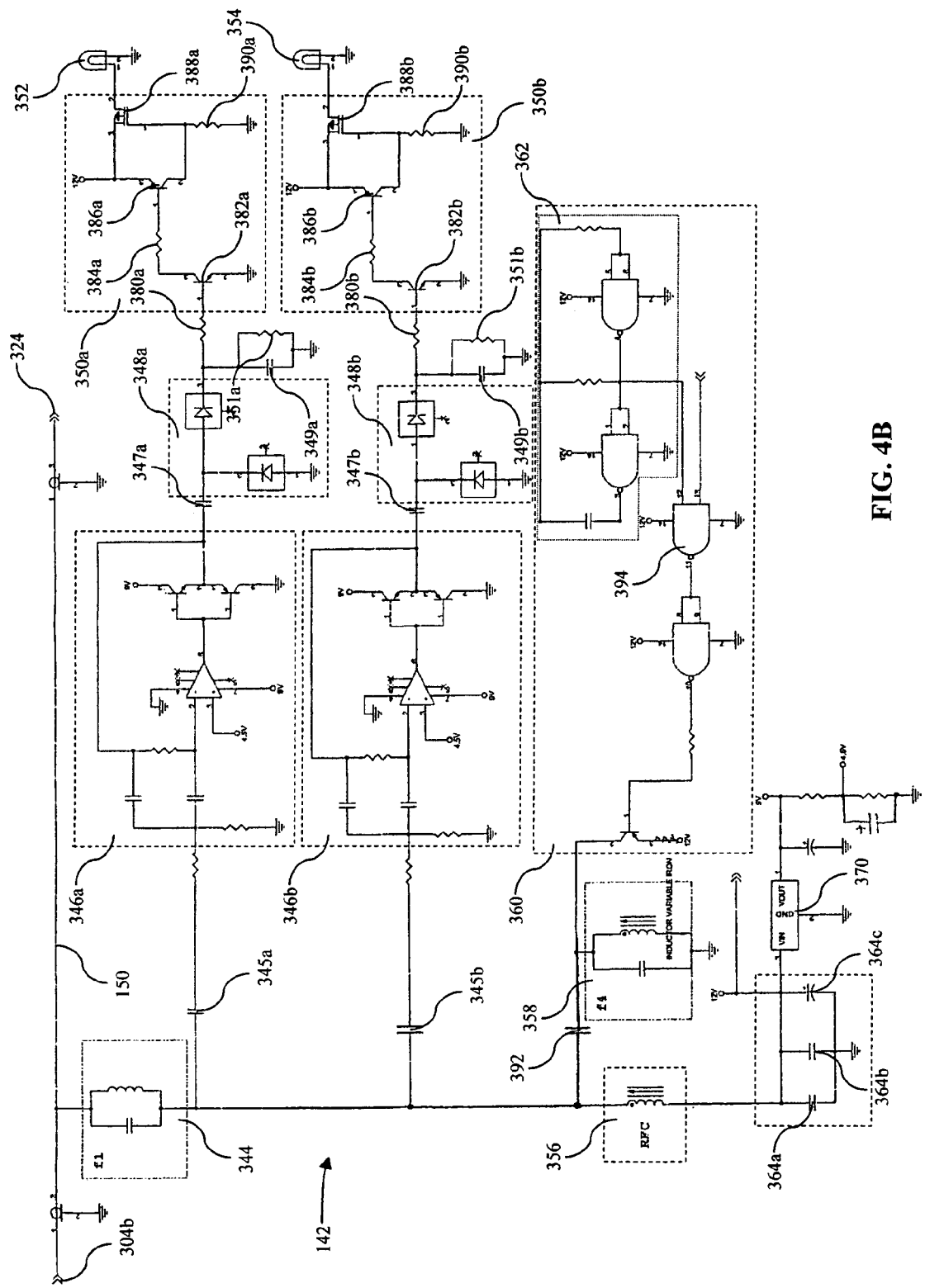
FIG. 4B is a circuit block diagram of the instrumentation center.

Referring now to FIG. 4B, a circuit block diagram of the instrumentation center 142 is shown. The center conductor of the coaxial cable 150 running through the instrumentation center 142 connects at input 304b to a coaxial cable (not shown) running down the mast to the interface unit 144. The center conductor of the coaxial cable 150 connects at output 324 to an antenna (not shown) for VHF radio communications. Besides the cable connectors, no other device or electrical component operates on or interferes with the VHF signals carried on the cable. Again, this feature is critical because a major use of the VHF marine radio is to call for help in case of emergencies.

A first tuned circuit 344 tuned to the VHF marine band connects to the center conductor of the coaxial cable 150 to prevent other DC and tone signaling circuits of the instrumentation center 142 from loading down and dissipating the VHF signals. Again, if more bandwidth is needed, the first tuned circuit 344 can be replaced with a double tuned circuit.

The bank of capacitors 364a, 364b, and 364c, identical to the bank of capacitors 342 in the interface unit 144 (FIG. 4A), are connected in parallel, bypassed to ground and connected in series through a radio frequency choke 356 to the first tuned circuit 344 to tap into the power on the center conductor of the coaxial cable 150. The radio frequency choke 356 and the bank of capacitors 364 connected in parallel serve the same functions as the radio frequency choke 340 and the bank of capacitors 342 in the interface unit 144. The bank of capacitors 364 connects to masthead devices and various circuit elements of the instrumentation center 142 to supply them with power. A voltage regulator 370 also connects to the bank of capacitors 364 to supply constant voltages (4.5 and 9 volts) to active bandpass filters 346a and 346b.

An active bandpass filter 346a connects to the center conductor of the coaxial cable 150 through the first tuned circuit 344. A capacitor 345a is placed between the first tuned circuit 344 and the active bandpass filter 346a to couple the control signals to the active bandpass filter 346a while preventing power from going to the active bandpass filter 346a. In one embodiment, the active bandpass filter 346a can be tuned to 40 kHz to pass a 40 kHz signal generated by the tone generator 332 (FIG. 4A) through to the output of the active bandpass filter 346a. The output of the active bandpass filter 346a is coupled through another capacitor 347a to a full wave diode rectifier 348a. A capacitor 349a bypassed to ground connects to the output of the full wave diode rectifier 348a to provide smoothing. A resistor 351a in parallel with the capacitor 349a forms a DC return and bleeder resistor. The output of the full wave diode rectifier 348a also connects to the input of an electrical switching circuit 350a that is responsive to the output of the full wave diode rectifier 348a to control power to, for example, an anchor lamp 352 connected to the output of the electrical switching circuit 350a.

In one embodiment, the electrical switching circuit 350a comprises an NPN transistor 382a whose base connects to the output of the full wave diode rectifier 348a through a resistor 380a that limits current into the base emitter junction of the NPN transistor 382a. When a tone signal passes through the active bandpass filter 346a and the full wave diode rectifier 348a, the NPN transistor 382a draws current through another resistor 384a connected to the base of a PNP transistor 386a. This other resistor 384a limits the current drawn through the base emitter junction of the PNP transistor 386a. The emitter of the PNP transistor 386a connects to the power source and to the source of a P-channel MOSFET 388a. The drain of the P-channel MOSFET 388a connects to the anchor light 352 and both the collector of the PNP transistor 386a and the base of the P-channel MOSFET 388a connect to ground through another resistor 390a. When the PNP transistor 386a draws current through resistor 390a, the gate of the P-channel MOSFET 388a connects to the source of the P-channel MOSFET 388a, thus turning off the anchor light 352. When a tone signal does not pass through the active bandpass filter 346a and the full wave diode rectifier 348a, the P-channel MOSFET 388a is turned on to provide power to the anchor light 352. Thus, in this embodiment, if any of the control circuitry should fail (i.e., the control circuitry fails to produce a tone signal), then the anchor light 352 will remain on.

Any number of masthead devices can be controlled in this way by adding similar circuitry described above. For example, another active bandpass filter 346b can also connect to the center conductor of the coaxial cable 150 through the first tuned circuit 344 and be tuned to 10 kHz. Another active bandpass filter 346b, another full wave diode rectifier 348b, another electrical switching circuit 350b, and a running light 354 can be connected in series such that the running light 354 is controlled by the tone generator 332 in the interface unit 144 of FIG. 4A.

The anchor light 352 and the running light 354 can be implemented with LEDs or incandescent lamps. The use of LEDs would reduce the current required at the masthead with a resulting reduction in the voltage drops in the various cables and coils.

In one embodiment, another component of the instrumentation center 142 is a modulating circuit 360 for modulating data output from a masthead device, e.g., an electronic wind vane 186 (FIGS. 2A and 2B). The modulating circuit 360 connects to the center conductor of the coaxial cable 150 through the first tuned circuit 344. A second tuned circuit 358 bypassed to ground is placed between a capacitor 392 and the modulating circuit 360. The second tuned circuit 358 is tuned to the frequency of the transceiver circuit 320 in the interface unit 144 (e.g., 240 kHz) (FIG. 4A). The modulating circuit 360 includes an oscillator 362 resonant at the frequency of the transceiver circuit 320. The output of the oscillator 362 and the output of the electronic wind vane are input to a NAND logic gate 394 to produce a series of tone bursts corresponding to the digital data output from, for example, the electronic wind vane. The output of the NAND logic gate 394 is inverted and amplified before being transmitted to the interface unit 144 via the coaxial cable 150.

In an embodiment using a wireless transceiver, the modulating circuit 460 and the second tuned circuit 358 would be replaced with a wireless transceiver circuit.

Figure 5A:
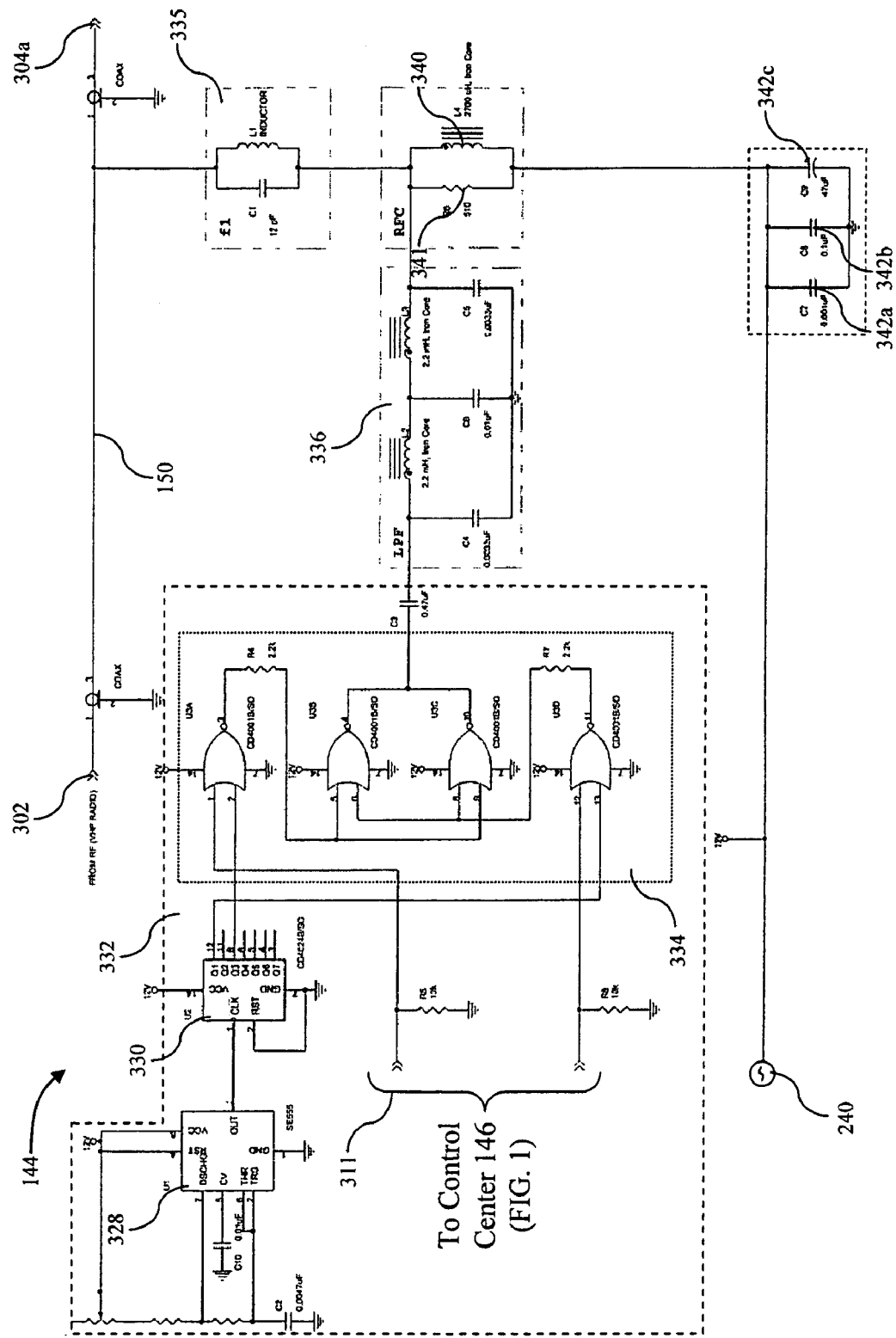
FIG. 5A is a circuit block diagram of another embodiment of the interface unit.
Figure 5B:
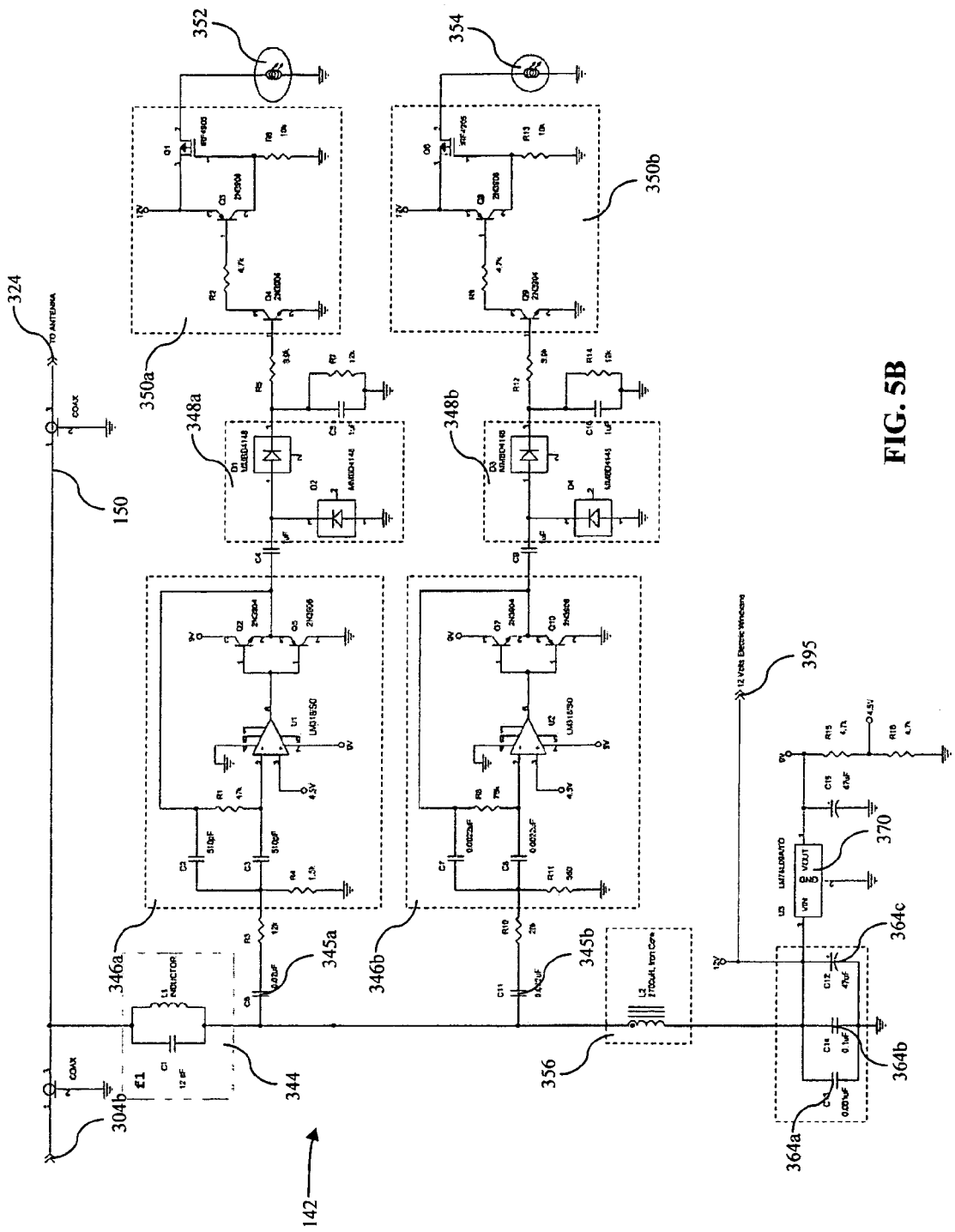
FIG. 5B is a circuit block diagram of another embodiment of the instrumentation center.

Referring now to FIGS. 5A and 5B, other embodiments of the interface unit 144 and the instrumentation center 142 are shown. These embodiments are analogous to the embodiments shown in FIGS. 4A and 4B except that the interface unit 144 does not include a data transceiver circuit 320 (to transmit and receive data to and from the masthead devices) and associated electronics and the instrumentation center 142 does not include a modulating circuit 360 (to modulate data output from masthead devices) and associated electronics.

While this invention has been particularly shown and described with references to preferred embodiments thereof, it will be understood by those skilled in the art that various changes in form and details can be made therein without departing from the scope of the invention encompassed by the appended claims. A control system according to the principles of the present invention described above can be applied to other vehicles or applications including cars, trucks, motor homes, aircraft, homes, manufacturing facilities, and buildings.

What is claimed is:

1. A masthead control system for a sailing vessel, comprising:
   an instrumentation center for mounting on a masthead;
   at least one masthead device coupled to the instrumentation center; and
   an interface unit coupled to the instrumentation center over a single cable, the interface unit providing power, at least one radio frequency signal, at least one data signal and at least one control signal to the at least one masthead device through the instrumentation center, with the power, the at least one radio frequency signal, the at least one data signal and the at least one control signal existing on the single cable between the interface unit and the instrument center and the power being provided to the at least one masthead device without influencing the at least one radio frequency signal.

2. The masthead control system of claim 1, wherein the at least one masthead device includes at least one of a VHF antenna, an FM radio antenna, a GPS antenna, a cellular antenna, a mechanical wind vane, an electronic wind vane, a temperature sensor, a pressure sensor, an inclinometer, a relative humidity sensor, a heater, a compass, a plurality of illumination lights, and a plurality of vessel running lights.

3. The masthead control system of claim 1, wherein the cable is a coaxial cable.

4. The masthead control system of claim 1, wherein a VHF radio device connects directly to a VHF antenna through the cable to provide continuous VHF radio communication services even if other components of the masthead control system malfunction or fail.

5. The masthead control system of claim 1, further comprising a control center coupled to the interface unit, the control center in communication with the at least one masthead device.

6. The masthead control system of claim 5, wherein the control center includes control circuitry for operating the at least one masthead device.

7. The masthead control system of claim 5, wherein the control center includes the interface unit.

8. The masthead control system of claim 1, wherein the interface unit comprises:
   a first tuned circuit tuned to a first frequency associated with the radio frequency signal and coupled to the cable; and
   a power source coupled to the first tuned circuit, the power source providing power to the at least one masthead device without influencing the radio frequency signal.

9. The masthead control system of claim 8, wherein the first tuned circuit is responsive to VHF marine band frequencies.

10. The masthead control system of claim 8, wherein the first tuned circuit is a double tuned circuit.

11. The masthead control system of claim 8, wherein the interface unit further comprises a tone generator coupled to the first tuned circuit, the tone generator generating at least one tone signal for controlling the at least one masthead device.

12. The masthead control system of claim 11, wherein the at least one tone signal is within a frequency band between 5 kHz and 50 kHz.

13. The masthead control system of claim 8, wherein the interface unit further comprises a transceiver circuit tuned to a second frequency associated with the data signals and coupled to the first tuned circuit, the transceiver circuit sending and/or receiving data signals to and/or from the at least one masthead device.

14. The masthead control system of claim 13, wherein the interface unit further comprises a second tuned circuit coupled to the transceiver circuit and the first tuned circuit, the second tuned circuit tuned to the second frequency associated with the data signals, the second tuned circuit allowing only the data signals to pass through to and/or from the transceiver circuit.

15. The masthead control system of claim 8, wherein the interface unit further comprises a first wireless transceiver circuit in wireless communication with a second wireless transceiver circuit, the second wireless transceiver circuit coupled to the at least one masthead device for sending and/or receiving data and/or control signals to and/or from the at least one masthead device.

16. The masthead control system of claim 1, wherein the instrumentation center comprises a first tuned circuit, the first tuned circuit tuned to a first frequency associated with the radio frequency signal and coupled between the cable and the at least one masthead device, the first tuned circuit preventing other instrumentation center circuitry from influencing the radio frequency signal.

17. The masthead control system of claim 16, wherein the first tuned circuit is a double tuned circuit.

18. The masthead control system of claim 16, wherein the first tuned circuit is responsive to VHF marine band frequencies.

19. The masthead control system of claim 16, wherein the instrumentation center further comprises at least one switching circuit, the at least one switching circuit coupled to the first tuned circuit and responsive to at least one corresponding tone signal to control at least one corresponding masthead device.

20. The masthead control system of claim 16, wherein the instrumentation center further comprises a transceiver circuit, the transceiver circuit coupled between the first tuned circuit and the at least one masthead device, the transceiver circuit tuned to a second frequency associated with the data signals, the transceiver circuit sending and/or receiving data signals to and/or from the interface unit.

21. The masthead control system of claim 16, wherein the instrumentation center further comprises a first wireless transceiver circuit in wireless communication with a second wireless transceiver circuit, the first wireless transceiver circuit coupled to the at least one masthead device for sending and/or receiving data and/or control signals to and/or from the interface unit.

* * * * *